Patented Feb. 26, 1929.

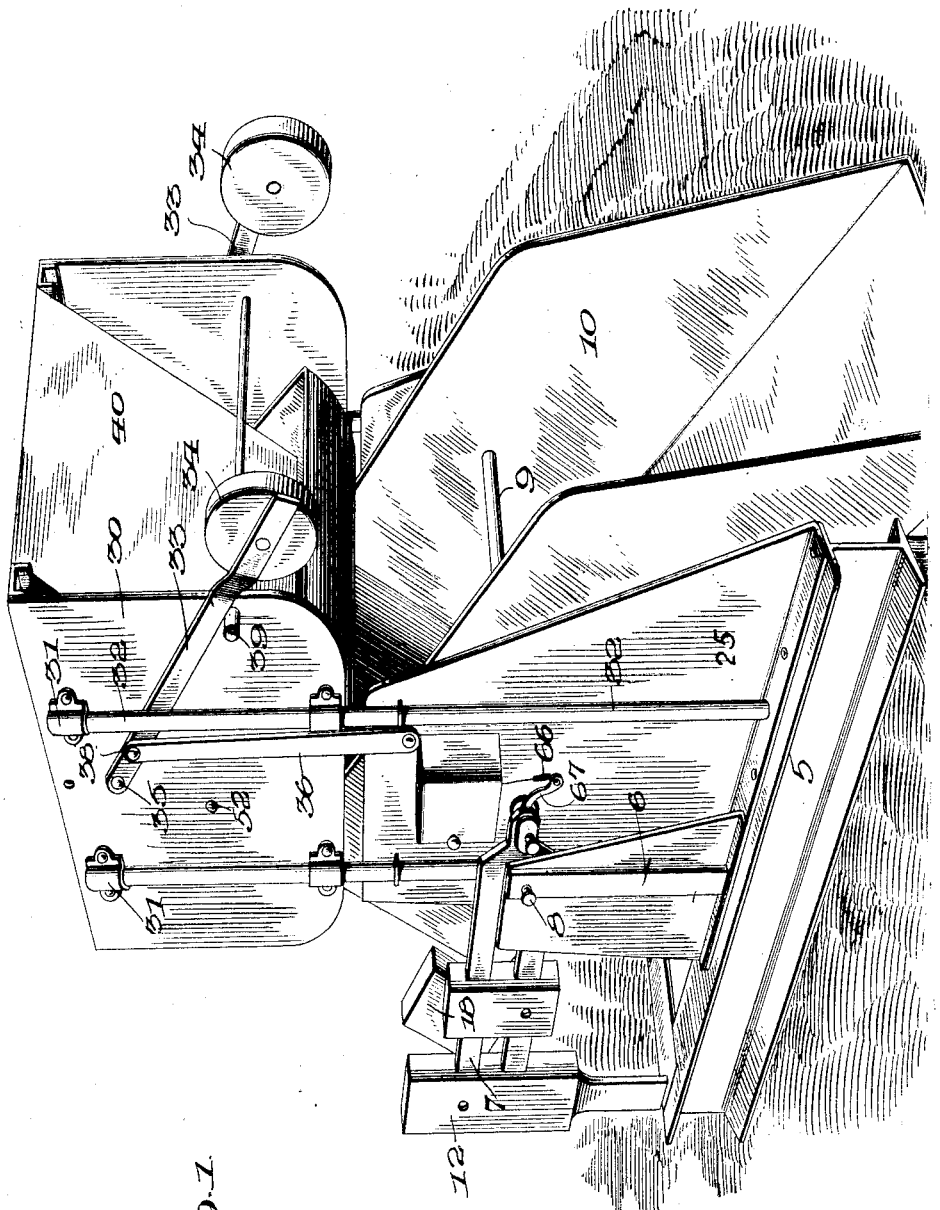

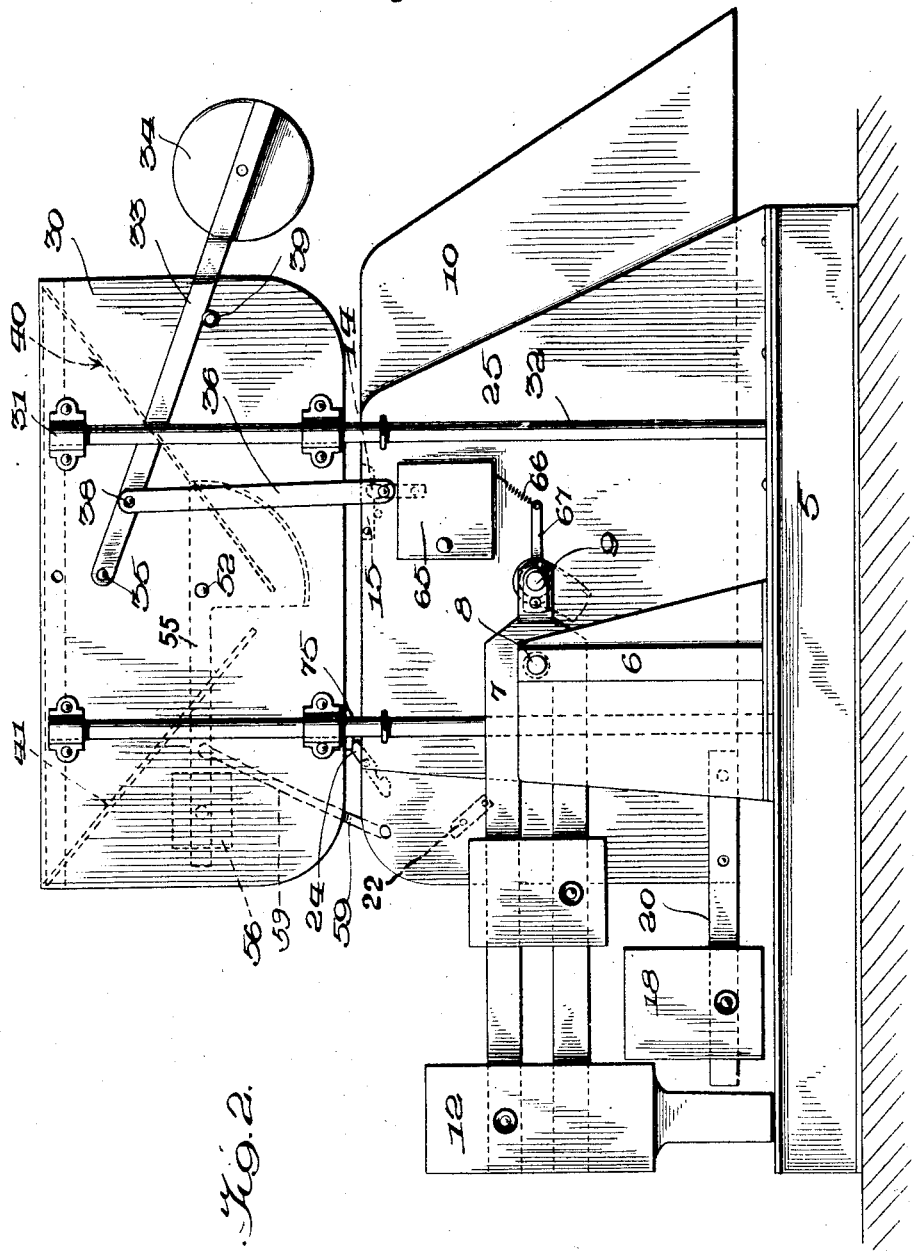

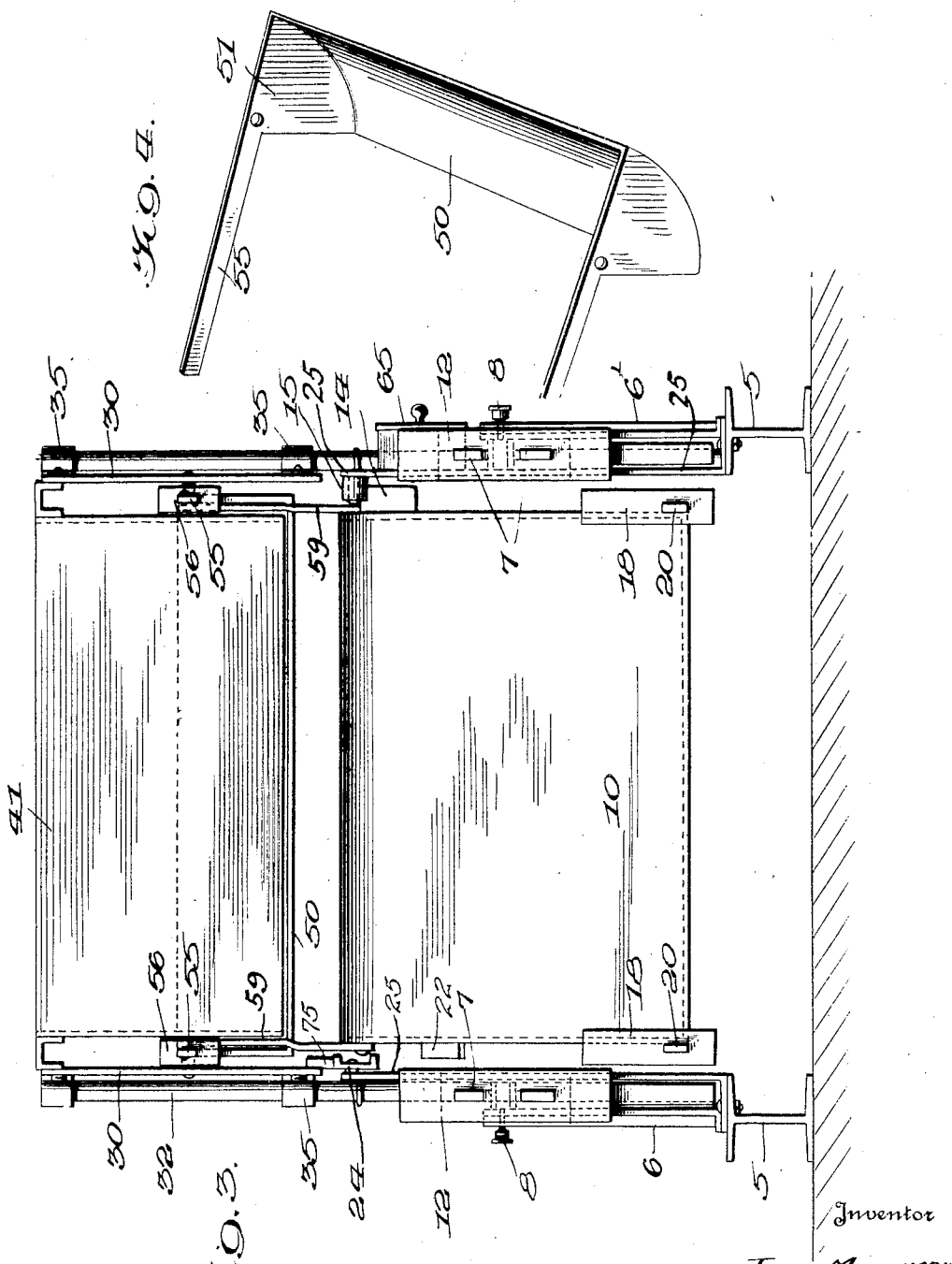

1,703,401

UNITED STATES PATENT OFFICE.

JOHN MARKMAN, OF FORRESTON, ILLINOIS.

WEIGHING MACHINE.

Application filed August 19, 1926, Serial No. 130,260. Renewed October 29, 1928.

This invention relates to weighing machines especially adapted for use in weighing sand, gravel, lime, coal, gypsum, cement and the like and an important object is to provide simple and reliable means whereby the machine is caused to dump when a predetermined quantity of material has been supplied thereto.

A further and equally important object of the invention is to provide a weighing machine in which the various parts thereof are actuated by the weight of the material and by separate properly positioned weights whereby the need of employing springs, so unreliable in operation,—is obviated.

Other objects and advantages will be apparent during the course of the following description.

In the accompanying drawings forming a part of this application and in which like numerals are employed to designate like parts throughout the same, Figure 1 is a perspective of the improved weighing machine;

Figure 2 is a side elevation of the same;

Figure 3 is an end elevation of the machine;

Figure 4 is a fragmentary perspective of a weighing machine constructed in accordance with the invention.

In the drawing, the numeral 5 designates a base of any suitable character, material and dimension. As illustrated in Figure 2 the base is provided at opposite sides thereof with standards 6 to which a pair of weighing arms 7 are fulcrumed as indicated at 8.

In carrying out the invention the forward portions of the arms 7 are connected by trunnions 9 to a combined weighing and discharge receptacle 10. At this point it is important to note that the combined weighing and discharge receptacle 10 is capable of horizontal pivotal movement about the axis of the trunnions 9 and that the arms 7 are supported for horizontal rocking movement as indicated at 8. Balancing weights 12 are adjustably mounted on the scale arms 7 which are, as illustrated in Figure 3, mounted at opposite sides of the machine.

The weights 12 normally hold the combined weighing and discharge receptacle in an elevated receptive position and when the receptacle is thus positioned, one or more lugs 14 carried by the same are engaged in the notch of a retaining member 15 as suggested in Figure 2. Thus when the weighing and discharge receptacle 10 is in a receptive position it will be positively held against pivotal movement on the trunnions 9 by the members 14 and 15.

However, when a predetermined quantity of material is supplied to the combined weighing and discharge receptacle 10 the weights 12 will be overcome and the arms 7 will partake of a limited movement in a clockwise direction. This will result in a slight descent of the combined weighing and discharge receptacle and in the release of the lug 14 from its retainer 15. When the lug 14 is thus released the receptacle 10 will be immediately swung to discharging position by reason of the weight of the contents of the same. In explaining this point, it is noted that the trunnions 9 are at one side of the center of gravity of the receptacle 10 when filled or partially filled and consequently the receptacle 10 will swing downwardly to discharging position the moment it is free to do so.

Figure 2 illustrates that the tilting of the receptacle 10 may be regulated by weights 18 mounted on arms 20 extended rearwardly from the receptacle. The weights 18 also serve to restore receptacle 10 to receiving position and are adjustable for use in connection with various materials.

When the receptacle 10 swings by gravity to discharging position it is temporarily locked there by coacting lugs 22 and 24 carried by the receptacle and one of a pair of side supports 25. More specifically, the lug 22 is adapted to be received in the notch of a pivotally supported member 24 carried by one of a pair of supporting plates 25. The pivotally supported retainer 24 is automatically released when the receptacle is to be refilled by a means to be described.

A receiving hopper 30 is mounted above the weighing and discharging receptacle 10 and is provided with pairs of upper and lower bearings 31 slidable within rather restricted limits on standards 32.

However, the receiving hopper 30 is normally held in an elevated position by a pair of levers 33, the outer terminals of which have weights 34. The inner portions of the levers 33 are pivoted as shown at 35 to the sides of the hopper 30. Actuating links 36 are connected to the intermediate portions of the levers 33 and to the upper portions of the supports 25 and by reason of the weights 34 on the outer portions of the levers 33 the hopper 30 is normally held in an elevated position. In other words, the weighted levers 33 fulcrum at 38 and thereby urge the hopper 30 upwardly. Suitable stops 39 are carried by the hopper 30 and form rests for the levers 33. This limits elevation of the hopper 30.

The hopper 30 is provided with downwardly and inwardly inclined walls 40 and 41, the ends of which are spaced from each other to define an opening for the discharge of material from the hopper.

In carrying out the invention the discharge opening in the hopper 30 is open when the weighing and discharge receptacle 10 is in a horizontal position. On the other hand, when the weighing and discharging receptacle 10 is in discharging position the hopper is closed to prevent the discharge of additional material. This is made possible by a transversely curved closure 50 adapted to extend across the discharge opening in the hopper, but normally in open position. The more or less segmental ends 51 of the closure 50 are pivoted as indicated at 52 to the sides of the hopper and are provided with arms 55 upon which counterweights 56 may be mounted. A pair of links 59 are connected to the arms 55 and to the receptacle 10 and provide a means whereby the hopper closure 50 is moved to closed position when the receptacle 10 is in discharging position. When the receptacle 10 is returned to a receptive position the links 59 will again open the hopper by moving the closure 50 to an extreme position.

A counter 65 may be attached to one of the supporting side plates 25 and is actuated by a flexible element 66 and by an extension 67 on the forward end of one of the scale arms 7.

In operation the weighing and discharging receptacle 10 is normally in a horizontal position and is locked in that position by the members 14 and 15. As previously stated, the hopper is normally in an open position so material may pass freely therethrough and enter the receptacle 10.

When a predetermined quantity of material has been supplied to the receptacle 10 the gravity of the arms 12 is overcome and the receptacle 10 moved downwardly about the axes of the pivots 8 whereupon the member 14 is disengaged from the member 15 and by reason of the trunnions 9 being off center the receptacle is moved to discharging position.

When the receptacle 10 is thus moved to discharging position, the links 59 will move the hopper closure 50 to closed position so that the supply of additional material to the receptacle is temporarily cut off.

When the receptacle 10 is thus swung to a discharge position the member 22 is engaged with the pivoted retainer 24 so that the receptacle is locked in a tilted position. The parts remain in his position until sufficient material has been supplied to the hopper 30 to weight the same down or, in other words to cause the hopper to overcome the gravity of the weight 34 whereupon the hopper may move downwardly. When the hopper is thus moved down a contact member 75 on the hopper is engaged with the rear end of the pivoted retainer 24 and causes the retainer to be released from engagement with the member 22. At this point, the weight 18 comes into play and returns the receptacle 10 to a horizontal position. As previously stated the return of the receptacle 10 to horizontal position will be assisted by the return of the closure 50 to open position so that the material previously collected in the hopper 30 and material subsequently supplied thereto may drop into the receptacle 10.

This cycle of operation may be repeated as often as required and each time the receptacle 10 is swung downwardly the tally member 65 will be operated to indicate the total number of units discharged.

The weights 34 may be sufficiently heavy to prevent sagging of hopper 30 until the weight of material therein is equal or substantially equal to the weight necessary to disengage 14, 15 and permit receptacle 10 to dump. Thus, latch 24 will not be disengaged from lug 22 until all the material in receptacle 10 has dumped. Furthermore it is obvious that by using proper weights 34 the hopper 30 can be used as a check on the accuracy of scale 7.

Having thus described the invention, what is claimed is:

1. A weighting machine comprising a receptacle, scale arms pivotally supporting the receptacle for movement about a horizontal axis, separate means spaced from said first named pivotal means for pivotally supporting the scale arms for movement about a horizontal axis, coacting locking devices for securing the receptacle in a receptive position and consisting of a pair of sections, one of which is fixed and the other being carried by the receptacle, a counterweight for said receptacle, a securing device for temporarily holding the receptacle in discharging position, said first named pivotal means being at one side of the center of gravity of said receptacle, a hopper having a discharge opening for the supply of material to said receptacle, a closure for said opening, and links connecting said closure and said receptacle whereby the movement of the receptacle to an inclined position results in the movement of the closure to closed position.

2. In a weighing machine having a base and a receiving hopper, a yieldingly supported tiltable weighing receptacle mounted upon said base beneath said hopper, the latter having a discharge opening emptying into said weighing receptacle, a swingable closure for said hopper opening, a weighted arm carried by said closure and tending to hold the closure in open position, a link pivoted to said arm and to said weighing receptacle whereby the closure will be actuated to closed position when the weighing receptacle tilts to discharge its contents, said weight tending to return the weighing receptacle to receiving position upon discharge of the contents thereof.

3. In a weighing machine having a base and a receiving hopper, a yieldingly supported tiltable weighing receptacle mounted upon said base beneath said hopper, the latter having a discharge opening emptying into said weighing receptacle, a swingable closure for said hopper opening, said closure tending to lie away from said hopper opening, and a link pivoted to said closure and to said weighing receptacle whereby the closure will be actuated to closed position when the weighing receptacle tilts to discharge its contents, the normally opened tendency of said closure tending to return the weighing receptacle to receiving position upon discharge of the contents thereof.

4. The structure defined in claim 3,—diametrically opposed upstanding plates carried by said base and between which said weighing receptacle works, coacting lugs carried by the proximate faces of one of said plates and one side of said weighing receptacle toward the rear end of the latter, the base lug being above the receptacle lug for normally holding the weighing receptacle in horizontal position for the reception of material from the hopper, said lugs being disengaged when the weighing receptacle has sagged predetermined distance under the weight of the predetermined quantity of material whereby the weighing receptacle is allowed to tilt forwardly to discharge position, the upper ends of said plates being adjacent said hopper outlet and preventing the material therefrom from scattering laterally.

5. In a weighing machine having a base and a tiltable yieldingly supported weighing receptacle, opposed upstanding plates carried by said base and between which said weighing receptacle works, coacting lugs carried by proximate faces of one of said plates and weighing receptacle rearwardly of the weighing receptacle, the plate lug being above the receptacle lug for normally holding the weighing receptacle in horizontal position for the reception of material, said lugs being disengaged when the weighing receptacle has sagged a predetermined distance under the weight of a predetermined quantity of material whereby the weighing receptacle is allowed to tilt to discharge position, said plates having their upper edges terminating in proximity to and slightly laterally of the hopper opening whereby to prevent the lateral scattering of material from the same.

6. The combination set forth in claim 3,— a lug pivoted to an upstanding portion of said base, said receptacle having a portion designed to be engaged by said lug when the receptacle tilts to discharging position to hold it in such position, and said lug having a heel which is adapted to be actuated to trip the lug from engagement with said receptacle, the latter when empty having a tendency to return to receiving position.

7. The combination set forth in claim 5 and a lug pivoted upon the inner face of one of said plates, said receptacle having a portion designed to be engaged by said lug when the receptacle tilts to discharging position to hold it in such position, and said lug having a heel engageable by said hopper, the latter being movable under the weight of material therein to engage said lug to trip the same from engagement with said receptacle whereby the latter may be returned to a position to receive material from said hopper.

8. In a weighing machine having a base and a tiltable weighing receptacle, a lug pivoted to an upstanding portion of said base, said receptacle having a portion designed to be engaged by said lug when the receptacle tilts to discharging position to hold it in such position, and said lug having a heel which is adapted to be actuated to trip the lug from engagement with said receptacle, the latter when empty having a tendency to return to receiving position.

9. In a weighing machine having a base, a tiltable weighing receptacle, and a receiving hopper movably supported for limited movement in the direction of said weighing receptacle, a lug pivoted to upstanding portion of said base, said receptacle having a portion designed to be engaged by said lug when the receptacle tilts to discharging position to hold it in such position, and said lug having a heel engageable by said hopper to trip said lug from engagement with said receptacle whereby the latter may be returned to a position to receive material from said hopper.

In testimony whereof I affix my signature.

JOHN MARKMAN.